US007970413B2

(12) United States Patent
Oshimi et al.

(10) Patent No.: US 7,970,413 B2
(45) Date of Patent: Jun. 28, 2011

(54) MOBILE COMMUNICATION TERMINAL CONNECTABLE TO WIRELESS LAN, COMMUNICATION CONTROL METHOD PERFORMED IN MOBILE COMMUNICATION TERMINAL, AND COMMUNICATION CONTROL PROGRAM RECORDED ON COMPUTER READABLE RECORDING MEDIUM

(75) Inventors: Haruyoshi Oshimi, Osaka (JP); Chiemi Yakura, Kadoma (JP); Naoyuki Tamai, Amagasaki (JP)

(73) Assignee: Kyocera Corporation, Kyoto (JP)

( * ) Notice: Subject to any disclaimer, the term of this patent is extended or adjusted under 35 U.S.C. 154(b) by 1106 days.

(21) Appl. No.: 11/727,220

(22) Filed: Mar. 26, 2007

(65) Prior Publication Data

US 2007/0232325 A1    Oct. 4, 2007

(30) Foreign Application Priority Data

Mar. 28, 2006    (JP) .................................. 2006-089087

(51) Int. Cl.
*H04W 4/00*    (2009.01)
(52) U.S. Cl. .................... 455/456.1; 455/403; 455/434; 709/203; 709/224; 709/225; 709/229
(58) Field of Classification Search .............. 455/456.1, 455/403, 434; 713/182, 203, 224, 225, 229
See application file for complete search history.

(56) References Cited

U.S. PATENT DOCUMENTS

2006/0230278 A1 * 10/2006 Morris .......................... 713/182
2007/0123194 A1 *  5/2007 Karaoguz et al. ............. 455/403

FOREIGN PATENT DOCUMENTS

| JP | H08-023570 | 1/1996 |
| JP | 2001-145162 | 5/2001 |
| JP | 2001-326975 | 11/2001 |
| JP | 2003-047060 | 2/2003 |
| JP | 2005-20110 A | 1/2005 |
| JP | 2005-123971 | 5/2005 |
| JP | 2006-050046 | 2/2006 |

OTHER PUBLICATIONS

Office Action from Japanese Patent Application No. 2006-089087, mailed on Sep. 14, 2010.
Notice of Allowance from Japanese Patent Application No. 2006-089087, mailed on Mar. 15, 2011.

* cited by examiner

*Primary Examiner* — Pierre-Louis Desir
(74) *Attorney, Agent, or Firm* — Morrison & Foerster LLP

(57) ABSTRACT

A mobile phone performs a search operation for searching for a communicable access point when a state of being able to communicate with an access point changes to a state of being unable to communicate. When a search operation is performed, the mobile phone displays that the search operation is being performed. In order to reduce power consumption, when the mobile phone displays that the search operation is being performed, the search operation is halted in response to acceptance of an input of an instruction to halt the search operation.

9 Claims, 4 Drawing Sheets

MOBILE COMMUNICATION TERMINAL CONNECTABLE TO WIRELESS LAN, COMMUNICATION CONTROL METHOD PERFORMED IN MOBILE COMMUNICATION TERMINAL, AND COMMUNICATION CONTROL PROGRAM RECORDED ON COMPUTER READABLE RECORDING MEDIUM

This application is based on Japanese Patent Application No. 2006-089087 filed with Japan Patent Office on Mar. 28, 2006, the entire content of which is hereby incorporated by reference.

BACKGROUND OF THE INVENTION

1. Field of the Invention

The present invention relates to a mobile communication terminal, and more particularly to a mobile communication terminal connectable to a wireless LAN, a communication control method performed in the mobile communication terminal, and a communication control program recorded on a computer readable recording medium.

2. Description of the Related Art

A mobile phone which wirelessly communicates with a base station by radio cannot communicate in a location outside a communication area where radio waves are not transmitted or in a location with poor reception even within the communication area. In this case, the mobile phone indicates out-of-service on its display to notify a user that he cannot communicate. Japanese Patent Laying-Open No. 2005-20110 discloses a mobile phone which indicates on a display portion that it is unable to communicate when the mobile phone is located out of a service area of a radio base station or when an interference radio wave interferes with a reception radio wave. The mobile phone includes a determination means for determining a state in which the mobile phone is located out of the service area and a state in which the interference radio wave interferes with the reception radio wave and notifying a user of the determination result.

However, in a case of a wireless LAN (Local Area Network), one mobile communication terminal may be included in the areas of access points of different kinds of LANs. In this case, the mobile communication terminal is connected to a wireless LAN selected from a plurality of wireless LANs. Furthermore, the mobile communication terminal may not be located within the service area of access point of one kind of wireless LAN but may be located within the service area of access point of another kind of wireless LAN. For example, when the mobile communication terminal moves from within the service area of one kind of wireless LAN out of that service area, the location after moving may be out of the service areas of all wireless LANs or may be within the service area of another kind of wireless LAN. The communication terminal searches for a wireless LAN that it can communicate with, and then automatically connects to the detected wireless LAN, in order to connect to the wireless LAN that it has communicated with or another wireless LAN to maintain the communication. Therefore, mere movement of the mobile communication terminal out of a service area of a wireless LAN consumes much power. In particular, since a mobile communication terminal is driven by a battery with a limited storage capacity, power consumption is preferably reduced as much as possible.

On the other hand, a user can empirically know whether within a service area of a wireless LAN or outside a service area. The user may know beforehand a location where a wireless LAN cannot be detected even if a connectable wireless LAN is searched for. However, the user does not know that the mobile communication terminal automatically searches for a wireless LAN in such a location and therefore cannot stop the search, thereby wasting the power.

SUMMARY OF THE INVENTION

The present invention is made to solve the aforementioned problem. An advantage of the present invention is to provide a mobile communication terminal with reduced power consumption, a communication control method performed in the mobile communication terminal, and a communication control program recorded in a computer readable recording medium.

In order to achieve the aforementioned advantage, in accordance with an aspect of the present invention, a mobile communication terminal includes: a wireless communication portion to be able to wirelessly communicate with a radio station apparatus; a search portion to perform a search operation for searching for a radio station apparatus with which communication is possible, when the wireless communication portion changes from a state of being able to communicate with the radio station apparatus to a state of being unable to communicate; a search state display portion to display that the search operation is being performed; and a halt portion to halt the search operation in response to acceptance of an input of an instruction to halt the search operation.

In accordance with another aspect of the present invention, a communication control method is performed in a mobile communication terminal including a wireless communication portion which is able to communicate with a radio station apparatus. The method includes the steps of: performing a search operation for searching for a radio station apparatus with which communication is possible, when the wireless communication portion changes from a state of being able to communicate with the radio station apparatus to a state of being unable to communicate; displaying that the search operation is being performed; and halting the search operation in response to acceptance of an input of an instruction to halt the search operation.

In accordance with a further aspect of the present invention, a communication control program is executed in a mobile communication terminal including a wireless communication portion being able to wirelessly communicate with a radio station apparatus and is stored in a computer readable recording medium. The program causes the mobile communication terminal to perform the steps of: performing a search operation for searching for a radio station apparatus with which communication is possible, when the wireless communication portion changes from a state of being able to communicate with the radio station apparatus to a state of being unable to communicate; displaying that the search operation is being performed; and halting the search operation in response to acceptance of an input of an instruction to halt the search operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
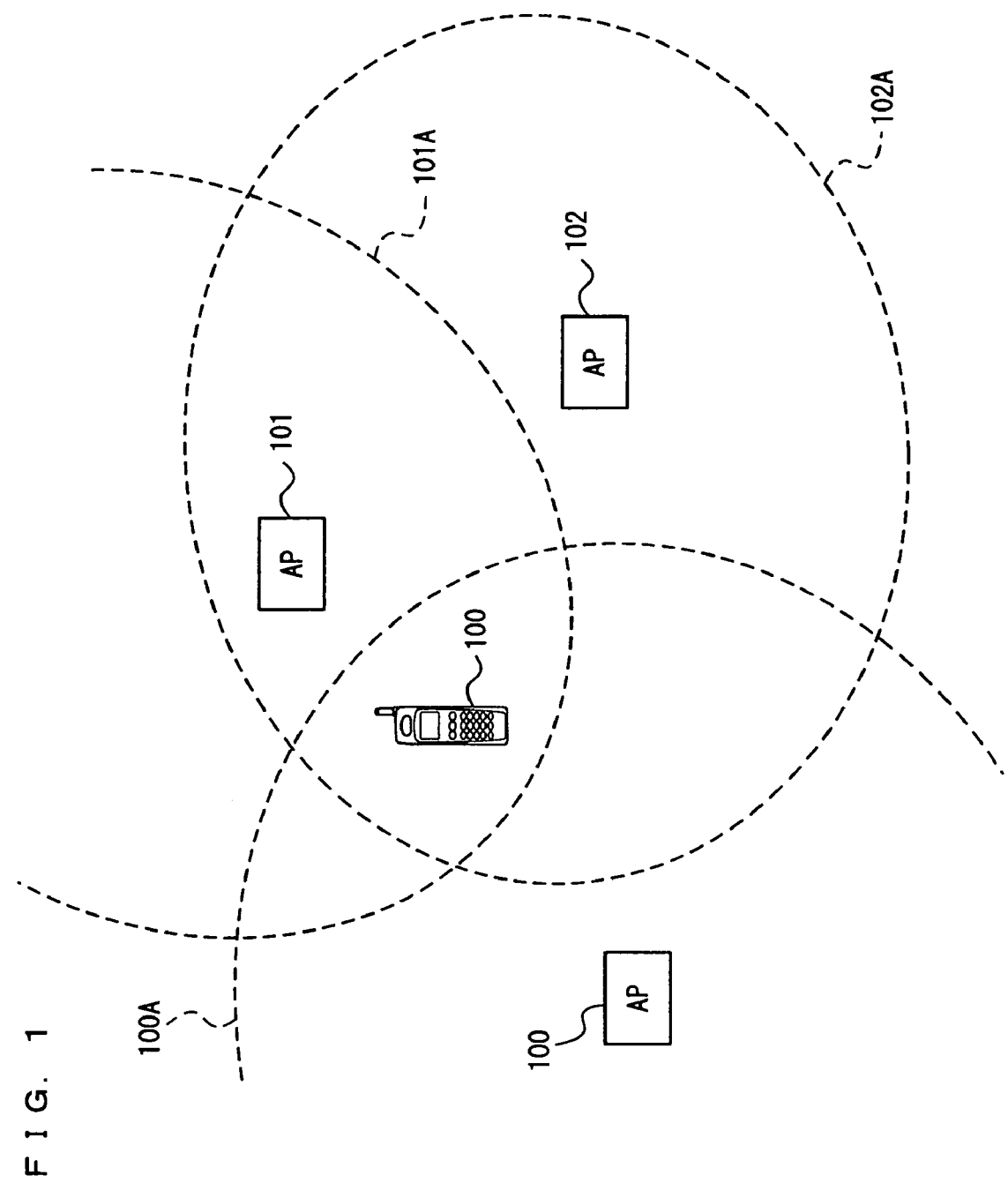
FIG. 1 shows an overview of a communication system in an embodiment of the present invention.

In the following, an embodiment of the present invention will be described with reference to the figures. In the following description, the same parts will be denoted with the same reference characters. The designations and functions are also the same. Therefore, a detailed description thereof will not be repeated.

FIG. 1 shows an overview of a communication system in an embodiment of the present invention. Referring to FIG. 1, the communication system includes a mobile phone 1 and three access points (AP) 100-102. Here, for the sake of illustration, three access points 100-102 are shown. However, the number of access points is not limited as long as one or more access points are provided. Access points 100-102 are radio station apparatuses which function as relays for different kinds of LANs. Here, a LAN to which access point 100 is connected is referred to as a first network, a LAN to which access point 101 is connected is referred to as a second network, and a LAN to which access point 102 is connected is referred to as a third network. For example, the first network is a LAN installed at home by a user on his own, the second network is a LAN provided by Company A, and the third network is a LAN provided by Company B.

Mobile phone 1 wirelessly communicates with any one of access points 100-102. For example, when mobile phone 1 wirelessly communicates with access point 100, mobile phone 1 is connected to the first network so that mobile phone 1 can communicate with another computer connected to the first network.

Usually, access points 100-102 are fixedly installed on the ground, each defining a communicable range. When mobile phone 1 is located within a communicable range 100A for access point 100, mobile phone 1 can wirelessly communicate with access point 100. However, when mobile phone 1 is located outside of communicable range 100A, mobile phone 1 cannot wirelessly communicate with access point 100. When mobile phone 1 is located within a communicable range 101A for access point 101, mobile phone 1 can wirelessly communicate with access point 101. However, when mobile phone 1 is located outside of communicable range 101A, mobile phone 1 cannot wirelessly communicate with access point 101. When mobile phone 1 is located within a communicable range 102A for access point 102, mobile phone 1 can wirelessly communicate with access point 102. However, when mobile phone 1 is located outside of communicable range 102A, mobile phone 1 cannot wirelessly communicate with access point 102.

Among communicable range 100A for access point 100, communicable range 101A for access point 101, and communicable range 102A for access point 102, there exist a region in which three of them overlap each other, a region in which two of them overlap each other, and a region in which none of them overlap. When mobile phone 1 exists at a location shown in FIG. 1, that location is included in the region in which all of communicable ranges 100A-102A for access points 100-102 overlap each other. Therefore, mobile phone 1 can wirelessly communicate with any of access points 100-102. When mobile phone 1 communicates with any of access points 100-102, for example, an identifier such as SSID (Service Set Identifier), ESSID (Extended SSID) or the like is used. Accordingly, even when mobile phone 1 is located in the region in which communicable ranges 100A-102A overlap each other, mobile phone 1 can wirelessly communicate with one of access points 100-102 which is selected by mobile phone 1.

Figure 2A:
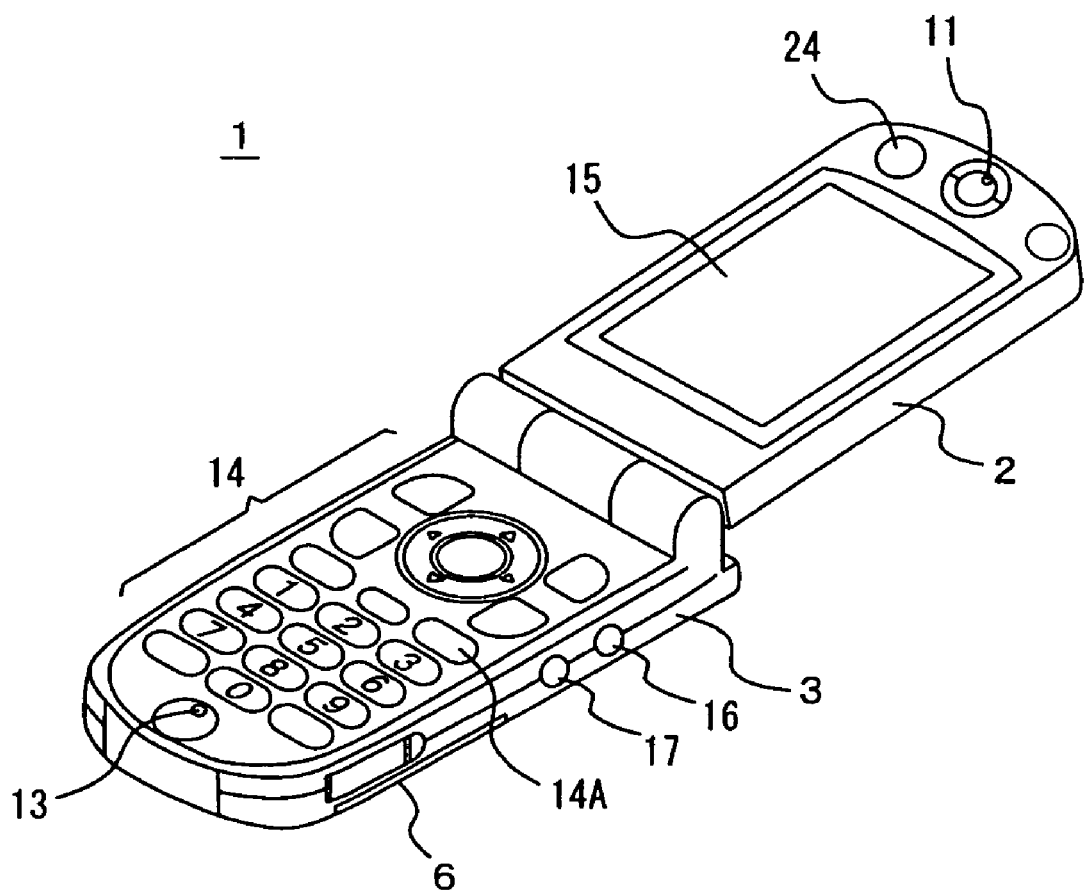
FIG. 2A and FIG. 2B are perspective views showing an external view of a mobile phone in an embodiment of the present invention.
Figure 2B:
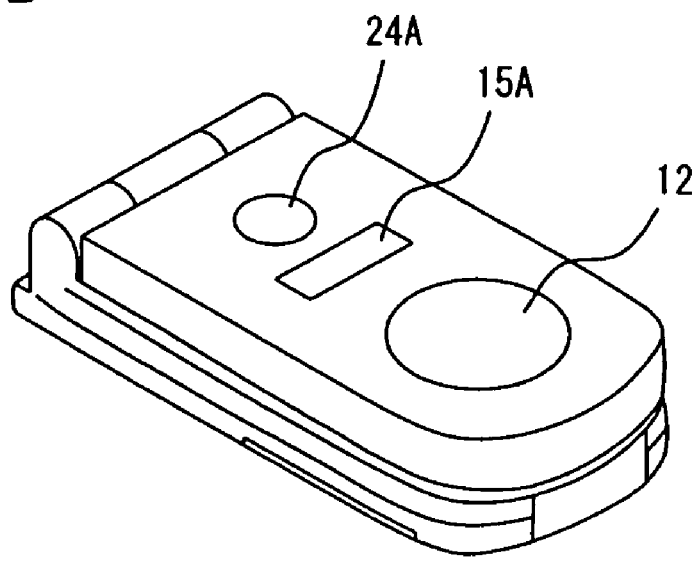

FIG. 2A and FIG. 2B are perspective views showing an external view of a mobile phone in an embodiment of the present invention. FIG. 2A shows an external view of an open-style mobile phone and FIG. 2B shows an external view of a closed-style mobile phone. Referring to FIG. 2A and FIG. 2B, a mobile phone 1 includes an operation-side portion 3 and a display-side portion 2. Operation-side portion 3 includes an operation key 14 including a power key 14A, a ten-key pad, a call key and the like and a microphone 13 arranged on the inner surface as well as a microphone terminal 16 and an earphone terminal 17 arranged on the right side surface. Display-side portion 2 includes a liquid crystal display (LCD) 15, a first speaker 11 forming a receiver and a camera 24 arranged on the inner surface as well as a camera 24A, a small-type LCD 15A and a second speaker 12 arranged on the outer surface. Here, mobile phone 1 includes LCD 15 by way of example. However, LCD 15 may be replaced by an organic EL (Electro Luminescence) display. Operation-side portion 3 and display-side portion 2 are rotatably coupled to each other by a hinge mechanism, and operation-side portion 3 and display-side portion are openable/closable. The state of mobile phone 1 in which mobile phone 1 is folded and operation-side portion 3 and display-side portion 2 are in a closed state is referred to as a closed style. The state of mobile phone 1 in which mobile phone 1 is open and operation-side portion 3 and display-side portion 2 are in an open state is referred to as an open style.

Figure 3:
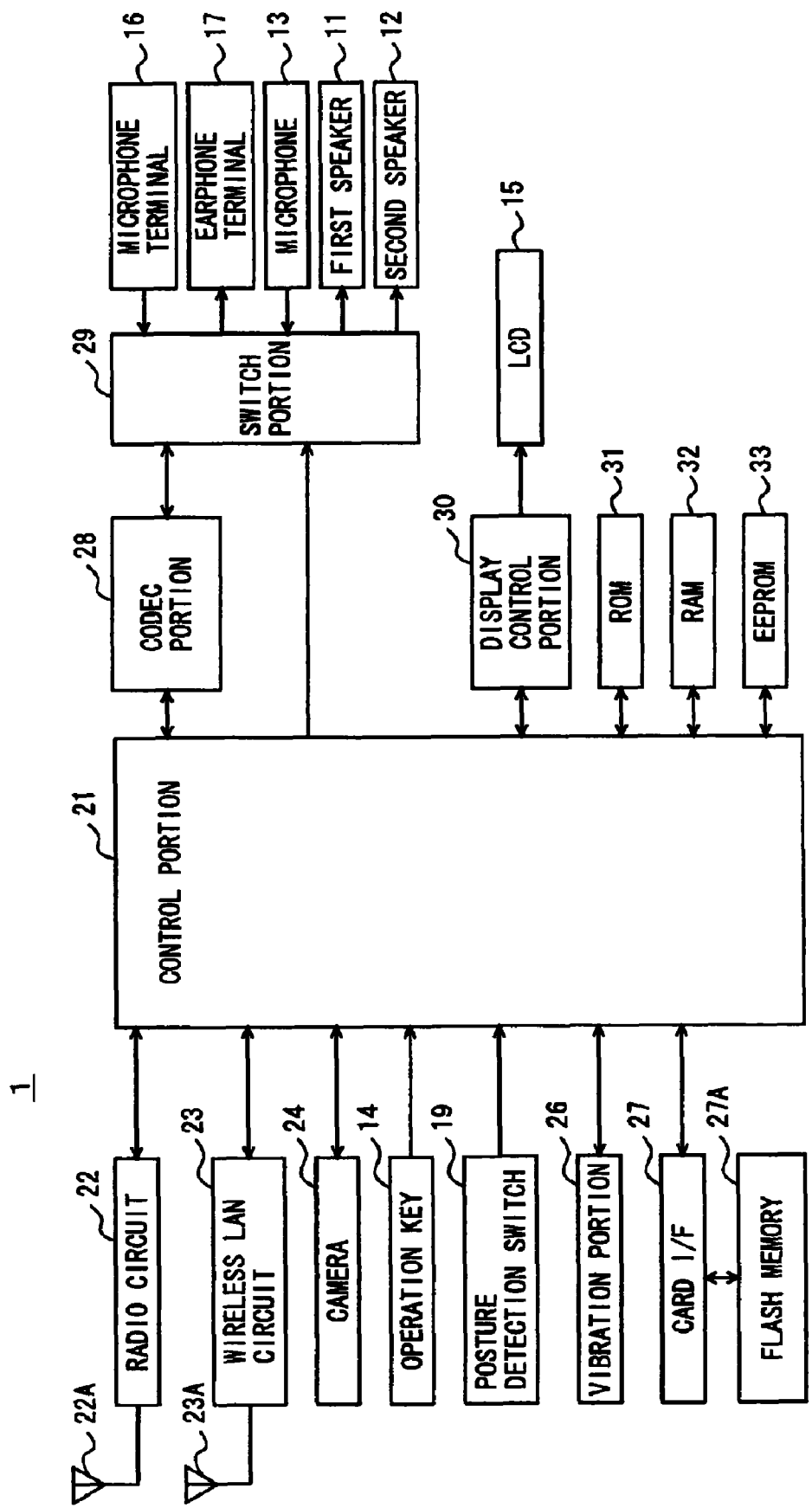
FIG. 3 is a functional block diagram showing an exemplary function of the mobile phone in the present embodiment.

FIG. 3 is a function block diagram showing an exemplary function of the mobile phone in the present embodiment. Referring to FIG. 3, mobile phone 1 includes a control portion 21 for controlling mobile phone 1 as a whole, a radio circuit 22 connected to an antenna 22A, a codec portion 28 for processing audio data, a switch portion 29 for switching input/output of codec portion 28, microphone 13, first speaker 11, second speaker 12, microphone terminal 16 and earphone terminal 17 each connected to switch portion 29, a wireless LAN circuit 23 connected to an antenna 23A, camera 24, operation key 14 accepting an input of a user's operation, a posture detection switch 19, a vibration portion 26, a display control portion 30 for controlling display on LCD 15, an ROM (Read Only Memory) 31 for storing a program executed in control portion 21 or the like, an RAM (Random Access Memory) 32 for use as a work area for control portion 21, and an EEPROM (Electronically Erasable and Programmable ROM) 33 storing address book data, emails and the like in a nonvolatile manner.

Posture detection switch 19 detects a relative position between operation-side portion 3 and display-side portion 2 and outputs the detected relative position to the control portion. Control portion 21 detects whether the posture of mobile phone 1 is in the closed style or in the open style, based on the output from posture detection switch 19.

Radio circuit 22 receives a radio signal received by antenna 22A and outputs an audio signal produced by demodulating the radio signal to codec portion 28. Radio circuit 22 also receives an audio signal from codec portion 28 and outputs a radio signal produced by modulating the audio signal to antenna 22A. Codec portion 28 decodes an audio signal input from radio circuit 22, converts the decoded digital audio signal into an analog signal, amplifies and then outputs the analog signal to switch portion 29. Codec portion 28 also receives an analog audio signal from microphone 13 or microphone terminal 16 through switch portion 29, converts and encodes the audio signal to a digital signal, and outputs the encoded audio signal to radio circuit 22.

Switch portion 29 is controlled by control portion 21 for switching input/output of an audio signal to codec portion 28. Switch portion 29 outputs an audio signal accepted from codec portion 28 to any of earphone terminal 17, first speaker 11 and second speaker 12. When an earphone is connected to earphone terminal 17, an audio signal accepted from codec portion 28 is output to earphone terminal 17. When no earphone is connected to earphone terminal 17, an audio signal accepted from codec portion 28 is output to second speaker 12, if mobile phone 1 is in a hands-free mode, and an audio signal accepted from codec portion 28 is output to first speaker 11, if mobile phone 1 is not in a hands-free mode. Mobile phone 1 is set to the hands-free mode by a user operating operation key 14. Even if mobile phone 1 is not set to the hands-free mode in the open style during a call in progress, control portion 21 sets the hands-free mode, once the state of mobile phone 1 changes to the closed style. Therefore, switch portion 29 outputs the audio signal accepted from codec portion 28 to first speaker 11, if mobile phone 1 is not set to the hands-free mode in the open style during a call in progress. However, once the state of mobile phone 1 changes to the closed style, switch portion 29 outputs the audio signal accepted from codec portion 28 to second speaker 12.

Switch portion 29 outputs an audio signal output by either microphone 13 or microphone terminal 16 to codec portion 28. If a microphone is connected to microphone terminal 16, switch portion 29 outputs the audio signal accepted from microphone terminal 16 to codec portion 28. If no microphone is connected to microphone terminal 16, switch portion 29 outputs the audio signal accepted from microphone 13 to codec portion 28.

Wireless LAN circuit 23 wirelessly communicates with any one of access points 100-102. Wireless LAN circuit 23 detects a beacon signal output by access points 100-102 to detect whether communication is possible or not for each of access points 100-102. Here, an operation of mobile phone 1 of detecting a beacon signal output by access points 100-102 is referred to as a search operation. Mobile phone 1 has two kinds of search operation.

A first kind of search operation is an operation of specifying a network and determining whether connection to the specified network is possible or not. Specifically, a beacon signal output by an access point connected to the specified network is detected. Mobile phone 1 may conduct the first kind of search operation even when mobile phone 1 is not located within the communicable range of the access point connected to the specified network. For example, mobile phone 1 is wirelessly connected to access point 100, by way of illustration. In this case, mobile phone 1 is located within communicable range 100A of access point 100. When mobile phone 1 moves out of communicable range 100A, the intensity of radio waves received from access point 100 by mobile phone 1 weakens. If the intensity of radio waves received from access point 100 becomes smaller than a prescribed threshold value T1, or if a transfer rate becomes smaller than a prescribed threshold value T2, mobile phone 1 starts the first kind of search operation. Even if mobile phone 1 is located within communicable ranges 101A, 102A of any of access points 101, 102 other than access point 100 at the time when the first kind of search operation is started, mobile phone 1 conducts the first kind of search operation to detect a beacon signal output by access point 100. When wireless communication with access point 100 is enabled during the first kind of search operation, mobile phone 1 wirelessly communicates with access point 100 again so that mobile phone 1 is connected to the first network. However, if a predetermined search time has elapsed without communication with access point 100 being enabled since the first kind of search operation was started, mobile phone 1 stops the first kind of search operation and then conducts the second kind of search operation.

The second kind of search operation is an operation of determining whether connection with a plurality of networks preliminarily registered in mobile phone 1 is possible or not, one by one. Here, the second kind of search operation is conducted following the first kind of search operation, and therefore it is not determined whether connection with the first network subjected to the first kind of search operation is possible or not. Specifically, here, assuming that the first to third networks are registered in mobile phone 1, it is determined whether a beacon signal output by access point 101 connected to the second network can be detected or not. If a beacon signal output by access point 101 can be detected, mobile phone 1 wirelessly communicates with access point 101. However, if not detected, then it is determined whether or not a beacon signal output by access point 102 connected to the third network can be detected or not. If a beacon signal output by access point 102 can be detected, mobile phone 1 wirelessly communicates with access point 102. However, if not detected, the second kind of search operation is ended. In short, mobile phone 1 determines whether connection with a plurality of networks preliminarily registered in mobile phone 1 is possible or not, one by one, and if connectable to any, mobile phone 1 connects to that network. However, if not connectable to any network, the second kind of search operation is ended.

Display control portion 30 is controlled by control portion 21 for controlling LCD 15 according to an instruction input from control portion 21 and allowing an image to appear on LCD 15. An image appearing on LCD 15 includes moving images and still images.

A removable flash memory 27A is inserted into card I/F 27. Control portion 21 can access flash memory 27A through card I/F 27. Here, a program executed by control portion 21 is stored in ROM 31 by way of example. However, a program may be stored in flash memory 27A and read from flash memory 27A to be executed by control portion 21. A recording medium storing a program is not limited to flash memory 27A and may be a flexible disc, a cassette tape, an optical disc (CD-ROM (Compact Disc-ROM)/MO (Magnetic Optical Disc)/MD (Mini Disc)/DVD (Digital Versatile Disc)), an IC card (including a memory card), an optical card, a semiconductor memory such as a mask ROM, EPROM, or EEPROM, or the like. Alternatively, mobile phone 1 may be connected to the Internet through radio circuit 22 or wireless LAN circuit 23 so that a program is downloaded from a computer connected to the Internet and executed by control portion 21. The program referred to herein includes not only a program directly executable by control portion 21 but also a source program, a compressed program, an encrypted program, or the like.

Camera 24 includes a lens and a photoelectric transducer such as a COMS (Complementary Metal Oxide Semiconductor) sensor to focus light collected by the lens onto the COMS sensor. The COMS sensor performs photoelectric conversion of the received light and outputs image data to control portion 21. Camera 24 is controlled by control portion 21 and starts picking up an image according to an instruction from control portion 21 to output the obtained still image data or moving image data to control portion 21. Camera 24 includes an image processing circuit performing image processing for improving the image quality of image data and an A/D conversion circuit converting analog image data to digital image data. Control portion 21 outputs the still image data or moving image data output by camera 24 to display control portion 30 for display on LCD 15, or encodes the still image data or moving image data in a compression encoding method for storage into EEPROM 34 or flash memory 27A inserted in card I/F 27. Camera 24 picks up an image of the user of mobile phone 1 when mobile phone 1 functions as a videophone.

EEPROM 33 stores the respective identifiers of the first network, the second network and the third network. The identifier is preliminarily input and stored in EEPROM 33 by the user operating operation portion 14.

Figure 4:
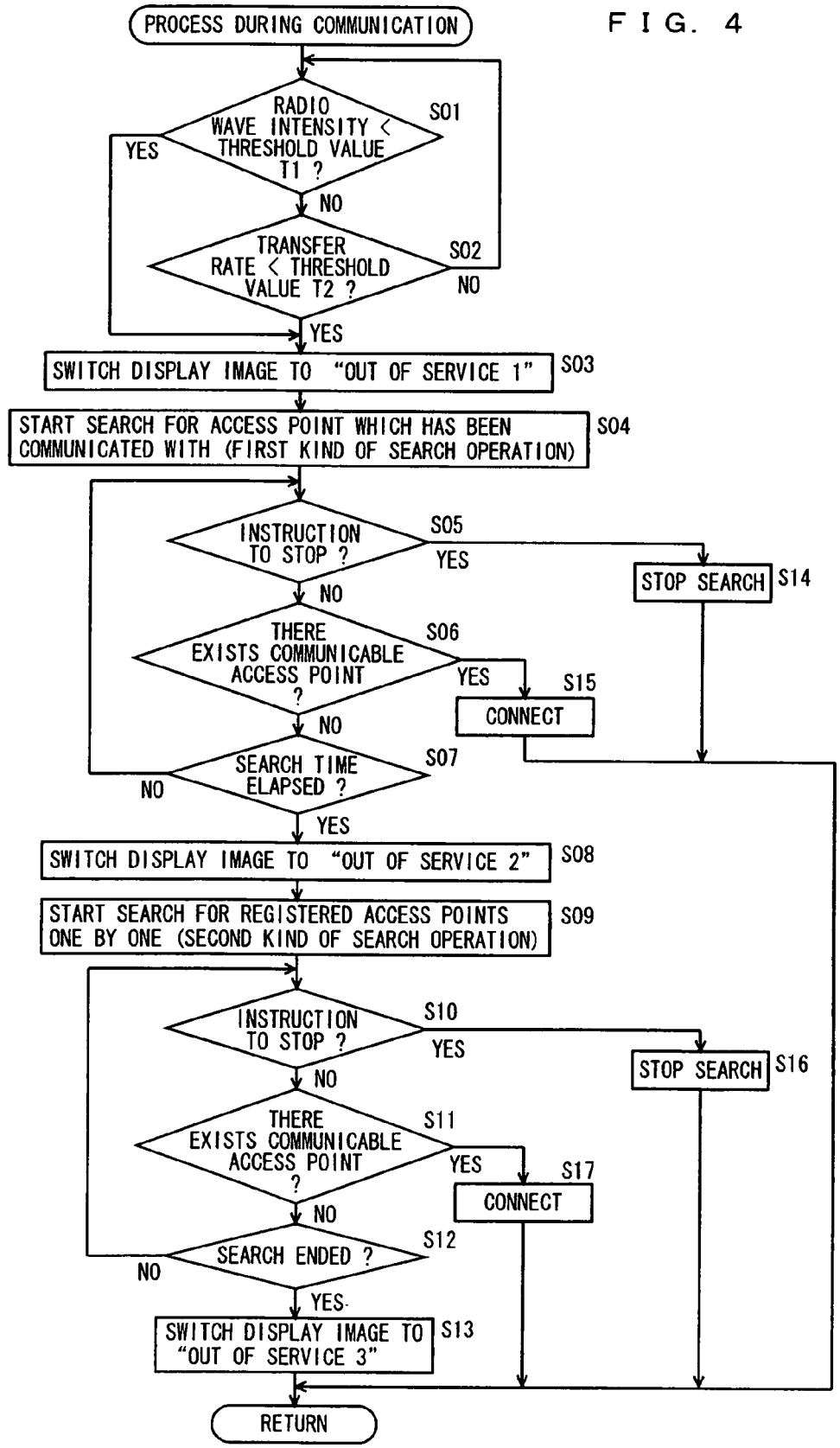
FIG. 4 is a flowchart illustrating an exemplary flow of a process during communication.

FIG. 4 is a flowchart illustrating an exemplary flow of a process during communication. The process during communication is a process performed by control portion 21 when control portion 21 executes a process-during-communication program. The process during communication is a process performed when mobile phone 1 connects to a wireless LAN for wireless communication. Here, mobile phone 1 wirelessly communicates with access point 100, by way of example. When mobile phone 1 is in a state of being able to wirelessly communicate with access point 100, mobile phone 1 displays "in service" on LCD 15 in order to indicate to the user that mobile phone 1 is located within the service area of access point 100. Here, the display image "in service" appears at a location different from that of the display image "in service", which appears on LCD 15 when mobile phone 1 is in a state of being able to communicate using radio circuit 22.

Referring to FIG. 4, it is determined whether or not the intensity of radio waves received from access point 100 becomes smaller than threshold value T1 (step S01). If the intensity of radio waves is smaller than threshold value T1, the process proceeds to step S03, and if not, the process proceeds to step S02. At step S02, it is determined whether or not the transfer rate becomes smaller than threshold value T2 in wireless communication with access point 100. If the transfer rate is smaller than threshold value T2, the process proceeds to step S03, and if not, the process returns to step S01.

At step S03, the display image "in service" appearing on LCD 15 is switched to a display image "out of service 1". Then, at step S04, access point 100 which has been communicated with is searched for. In other words, the first kind of search operation as described above is started. Therefore, the display image "out of service 1" is information indicating that mobile phone 1 conducts the first kind of search operation.

At step S05, it is determined whether an instruction to stop the first kind of search operation is accepted or not. If an instruction to stop is accepted, the process proceeds to step S14. If an instruction to stop is not accepted, the process proceeds to step S06. When the user presses a predetermined stop key of operation keys 14, control portion 21 detects the press on the stop key and accepts the instruction to stop the first kind of search operation. At step S14, the first kind of search operation is stopped and the process then ends. Accordingly, the first kind of search operation can be stopped on the user's own will, thereby preventing mobile phone 1 from conducting an unnecessary search and thus preventing wasted power consumption.

At step S06, it is determined whether a communicable access point exists or not. Here, since the first kind of search operation is being executed, it is determined whether communication with access point 100 is enabled or not. If there exists a communicable access point, the process proceeds to step S15, and if not exist, the process proceeds to step S07. At step S15, connection with the first network is established by communicating with access point 100 with which communication is enabled. The process then ends.

At step S07, it is determined whether the search time has elapsed or not since the first kind of search operation was started. If the search time has elapsed, the process proceeds to step S08, and if not, the process returns to step S05. Therefore, mobile phone 1 communicates with access point 100 when communication with access point 100 is enabled again by the time the search time has elapsed since the first kind of search operation was started. However, for example when the user moves out of communicable range 100A of access point 100, the execution of the first kind of search operation over the search time is stopped, thereby preventing wasted power consumption.

At step S08, the display image "out of service 1" appearing on LCD 15 is switched to a display image "out of service 2". Then, at step S09, the registered access points are searched one by one. In other words, the second kind of search operation as described above is started. Therefore, the display image "out of service 2" is information indicating that mobile phone 1 is conducting the second kind of search operation.

At step S10, it is determined whether an instruction to stop the second kind of search operation is accepted or not. If an instruction to stop is accepted, the process proceeds to step S16, and if an instruction to stop is not accepted, the process proceeds to step S11. When the user presses a predetermined stop key of operation keys 14, control portion 21 detects the press on the stop key and accepts the instruction to stop the second kind of search operation. At step S16, the second kind of search operation is stopped, and the process then ends. Therefore, the second kind of search operation can be stopped on the user's own will, thereby preventing mobile phone 1 from conducting an unnecessary search and thus preventing wasted power consumption.

At step S11, it is determined whether a communicable access point exists or not. Here, since the second kind of search operation is being executed, it is determined whether communication with access point 101 is enabled or not. If a communicable access point exists, the process proceeds to step S17, and if not exist, the process proceeds to step S12. At step S17, wireless connection with access point 101 with which communication is enabled is established, and the process then ends.

At step S12, it is determined whether the second kind of search operation is ended. If the second kind of search operation is ended, the process proceeds to step S13, and if not, the process returns to step S10. If the search has ended for all the networks, excluding the first network which was searched for in the first kind of search operation, among the registered networks, it is determined that the second kind of search operation is ended. Here, the third network has not yet been searched for, and therefore the process returns to step S10.

At step S13, the display image "out of service 2" appearing on LCD 15 is switched to a display image "out of service 3". When "out of service 3" is displayed, the second kind of search operation has ended, and therefore the display image "out of service 3" is information indicating that the search is ended. When the process proceeds to step S13, wireless LAN circuit 23 is not activated so that power consumption by wireless LAN circuit 23 is the lowest.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile communication terminal comprising:
   a wireless communication portion to be able to wirelessly communicate with a radio station apparatus;
   a search portion to perform a search operation for searching for a radio station apparatus with which communication is possible, when said wireless communication portion changes from a state of being able to communicate with said radio station apparatus to a state of being unable to communicate;
   a search state display portion to display that said search operation is being performed; and
   a halt portion to halt said search operation in response to acceptance of an input of an instruction to halt said search operation,
   wherein said search portion includes
      a first search portion to perform a first search operation for searching for said radio station apparatus which has been communicated with, when said wireless communication portion changes from a state of being able to communicate with said radio station apparatus to a state of being unable to communicate, and
      a second search portion to perform a second search operation for searching for a preliminarily registered radio station apparatus, when a prescribed period of time has elapsed with a state of being unable to communicate being kept, and
   said search state display portion includes
      a first search state display portion to display first information indicating that said first search operation is being performed during said prescribed period of time, and
      a second search state display portion to display second information different from said first information, while indicating that said second search operation is being performed after said prescribed period of time elapsed.

2. The mobile communication terminal according to claim 1, further comprising a communicable state display portion to display an indication of a state of being able to communicate, in a state in which communication by said wireless communication portion is possible.

3. The mobile communication terminal according to claim 1, further comprising a search end state display portion to display third information being different from said first information and said second information, and indicating a search end state, when a search operation ends without entering a state in which communication by said wireless communication portion is possible.

4. A communication control method performed in a mobile communication terminal including a wireless communication portion which is able to communicate with a radio station apparatus, comprising the steps of:
   performing a search operation for searching for a radio station apparatus with which communication is possible, when said wireless communication portion changes from a state of being able to communicate with said radio station apparatus to a state of being unable to communicate;
   displaying that said search operation is being performed; and
   halting said search operation in response to acceptance of an input of an instruction to halt said search operation,
   wherein said performing a search includes
      performing a first search operation for searching for said radio station apparatus which has been communicated with, when said wireless communication portion changes from a state of being able to communicate with said radio station apparatus to a state of being unable to communicate, and
      performing a second search operation for searching for a preliminarily registered radio station apparatus, when a prescribed period of time has elapsed with a state of being unable to communicate being kept, and
   said displaying includes
      displaying first information indicating that said first search operation is being performed during said prescribed period of time, and
      displaying second information different from said first information, while indicating that said second search operation is being performed after said prescribed period of time elapsed.

5. The communication control method according to claim 4, further comprising the step of displaying an indication of a state of being able to communicate, in a state in which communication by said wireless communication portion is possible.

6. The communication control method according to claim 4, further comprising the step of displaying third information being different from said first information and said second information, and indicating a search end state, when a search operation ends without entering a state in which communication by said wireless communication portion is possible.

7. A non-transitory computer-readable medium storing thereon a communication control program executed in a mobile communication terminal including a wireless communication portion being able to wirelessly communicate with a radio station apparatus, said communication control program causing said mobile communication terminal to perform a method comprising:
   performing a search operation for searching for a radio station apparatus with which communication is possible, when said wireless communication portion changes from a state of being able to communicate with said radio station apparatus to a state of being unable to communicate;
   displaying that said search operation is being performed; and
   halting said search operation in response to acceptance of an input of an instruction to halt said search operation,
   wherein said performing a search operation includes
      searching for said radio station apparatus which has been communicated with, when said wireless communication portion changes from a state of being able to communicate with said radio station apparatus to a state of being unable to communicate, and
      searching for a preliminarily registered radio station apparatus, when a prescribed period of time has elapsed with a state of being unable to communicate being kept, and
   said displaying includes
      displaying first information indicating that said first search operation is being performed during said prescribed period of time, and
      displaying second information different from said first information, while indicating that said second search operation is being performed after said prescribed period of time elapsed.

8. The non-transitory computer-readable medium according to claim 7, the method further comprising displaying an indication of a state of being able to communicate, in a state in which communication by said wireless communication portion is possible.

9. The non-transitory computer-readable medium according to claim 7, the method further comprising displaying third information being different from said first information and said second information, and indicating a search end state, when a search operation ends without entering a state in which communication by said wireless communication portion is possible.

* * * * *